United States Patent [19]

Harasewych

[11] 4,361,167

[45] Nov. 30, 1982

[54] SNAP-ACTING DRAIN VALVE

[75] Inventor: Bohdan A. Harasewych, Flourtown, Pa.

[73] Assignee: Ogontz Controls Company, Willow Grove, Pa.

[21] Appl. No.: 204,548

[22] Filed: Nov. 6, 1980

Related U.S. Application Data

[63] Continuation-in-part of Ser. No. 92,610, Nov. 29, 1979, abandoned.

[51] Int. Cl.³ .............................................. E03B 7/10
[52] U.S. Cl. .................................. 137/62; 236/48 R; 251/67; 251/74; 251/77
[58] Field of Search .................. 236/48 R, 93 R, 99 J; 137/62; 251/74, 77, 67

[56] References Cited

U.S. PATENT DOCUMENTS

| 410,693 | 9/1889 | Miller . | |
| 642,154 | 1/1900 | Perry . | |
| 905,426 | 12/1908 | Haywood | 236/48 R |
| 1,325,896 | 12/1919 | Long . | |
| 1,526,718 | 2/1925 | Opp . | |
| 2,137,561 | 11/1938 | Asselin | 251/74 X |
| 2,264,655 | 12/1941 | Brackmann | 251/74 X |
| 2,688,460 | 9/1954 | Borgerd | 137/62 X |
| 2,716,418 | 8/1955 | Borgerd | 137/61 |
| 2,822,693 | 2/1958 | Mulsow | 137/62 X |
| 3,040,772 | 6/1962 | Todd | 137/509 |
| 3,174,324 | 3/1965 | Ostertag | 251/74 X |
| 3,327,760 | 6/1967 | Crawford, Jr. | 251/74 X |
| 3,349,786 | 10/1967 | Martin | 251/74 X |
| 3,369,556 | 2/1968 | Allerdice | 137/62 |
| 3,765,604 | 10/1973 | Trubert et al. | 236/100 X |
| 4,004,601 | 1/1977 | Bachelder et al. | 251/74 X |
| 4,026,465 | 5/1977 | Kenny | 236/48 R |

Primary Examiner—William E. Tapoloal
Attorney, Agent, or Firm—Richard D. Weber

[57] ABSTRACT

A snap-acting drain valve for draining a fluid system upon the occurrence of a predetermined temperature condition of the fluid. A spring-loaded valve is held closed against the spring force by a latching mechanism comprising a spring loaded latching lever engaging a shoulder on the valve stem, and a temperature sensitive actuator controlling movement of the latching lever. Upon occurrence of the predetermined fluid temperature, the actuator permits the latching lever to disengage from the valve stem shoulder, thereby releasing the valve which opens under spring force. The valve is non-modulating and will not close until manually reset even if the fluid temperature should increase to a level above the predetermined level.

18 Claims, 13 Drawing Figures

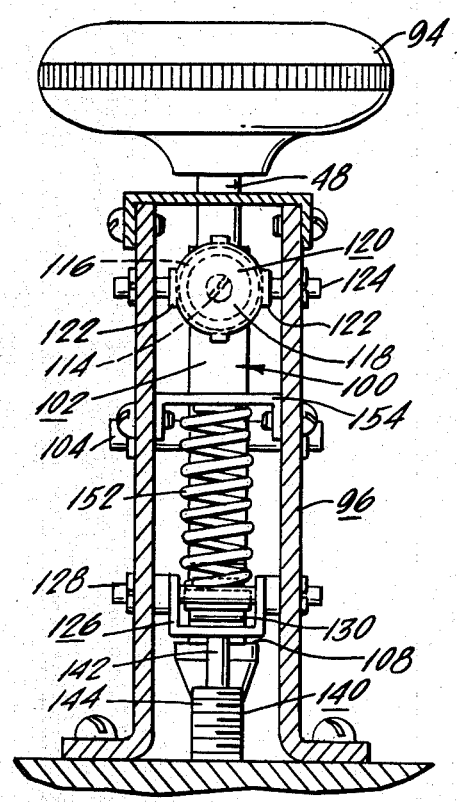
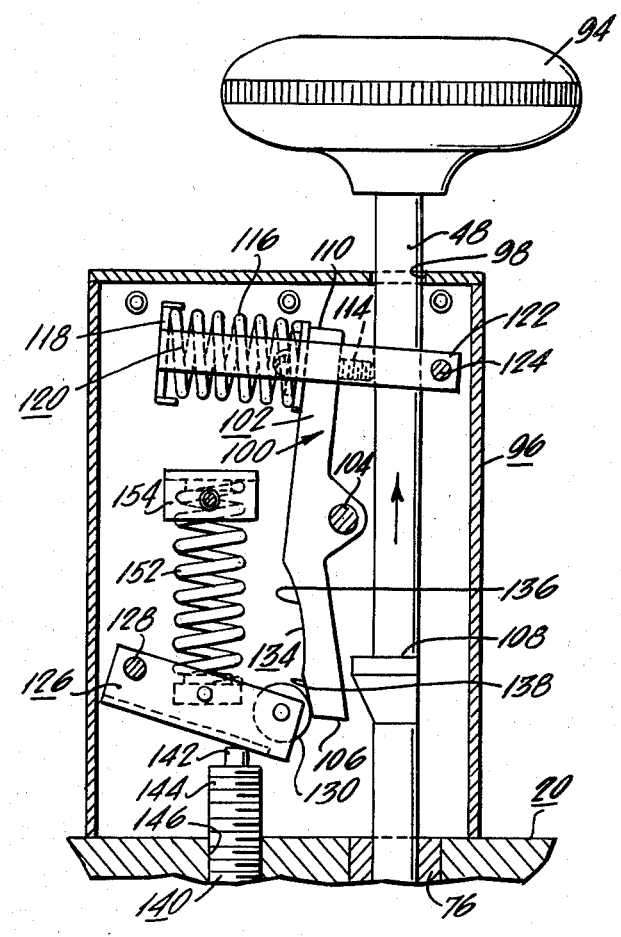
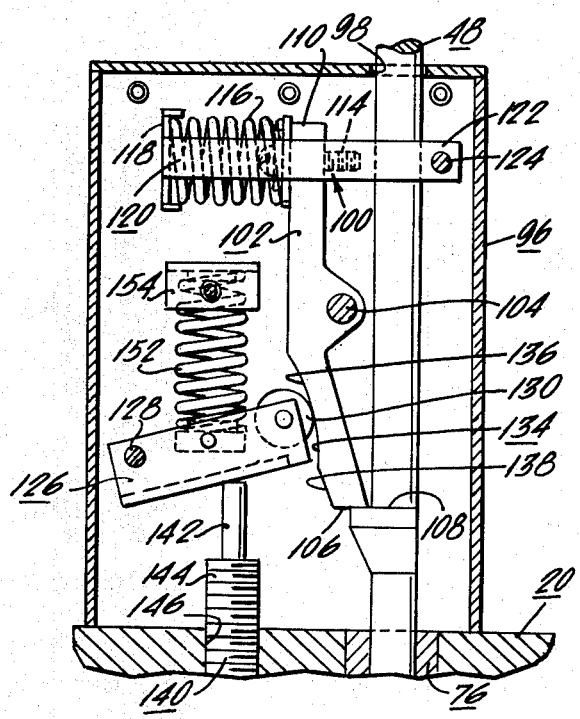
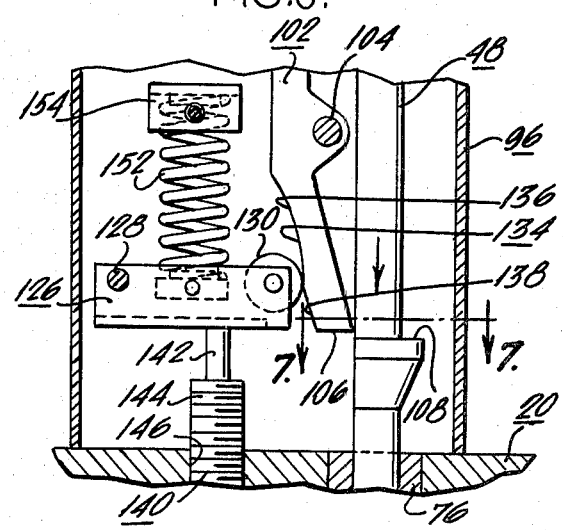
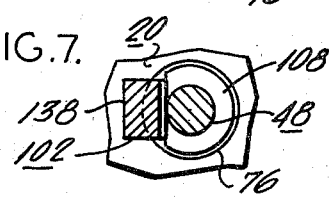

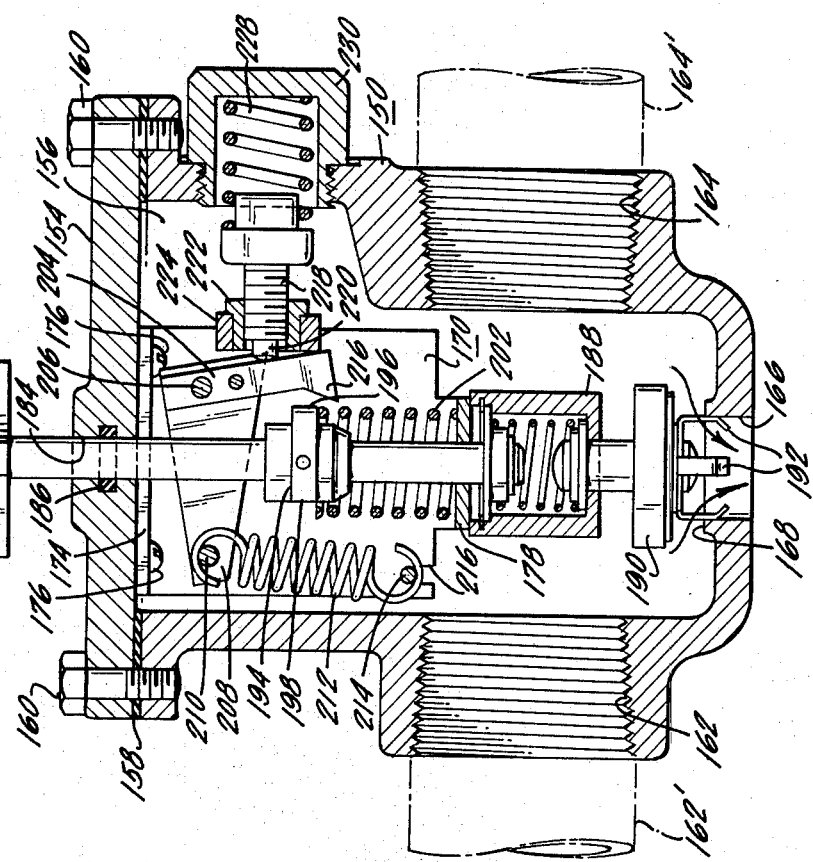
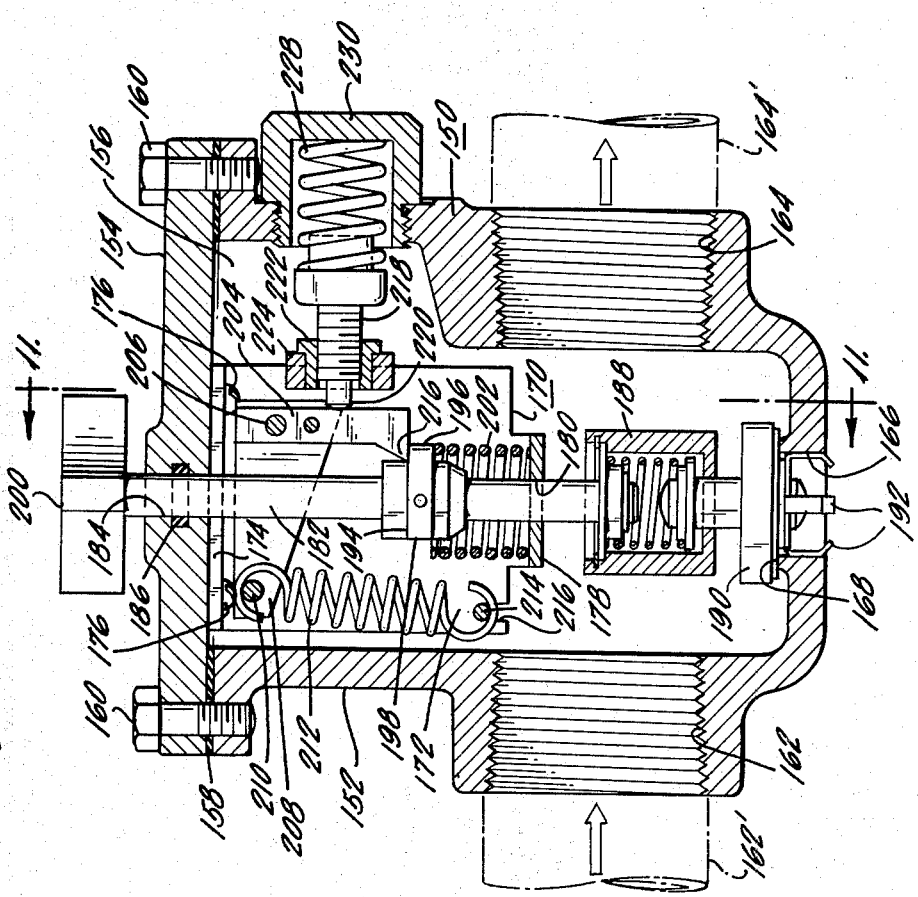

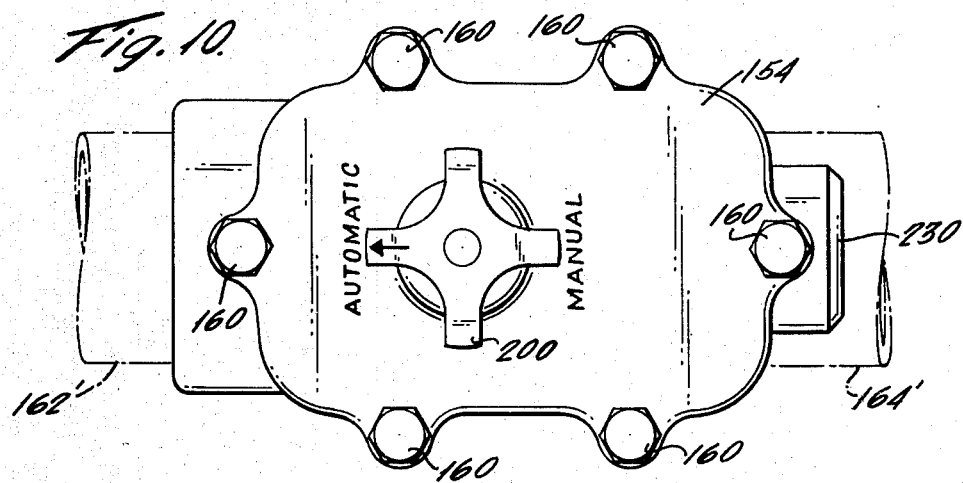
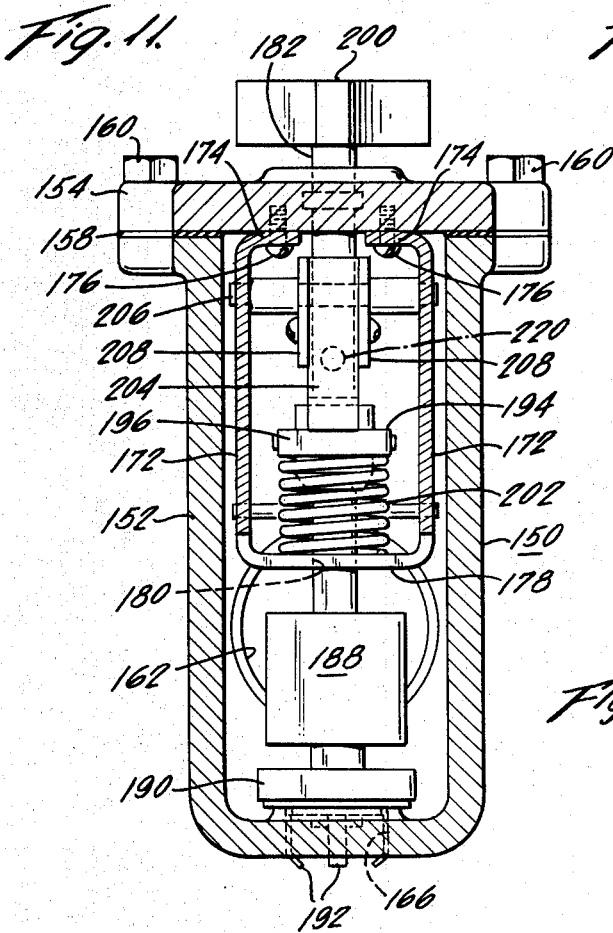
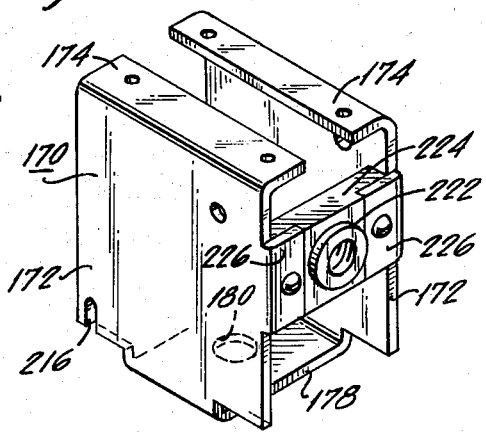
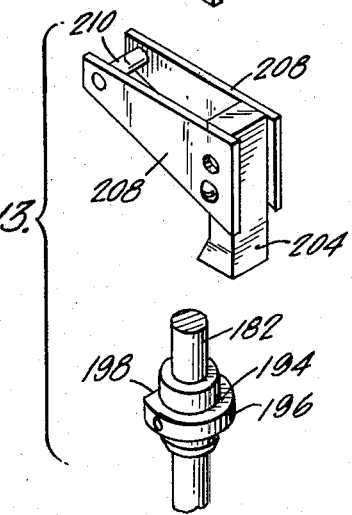

SNAP-ACTING DRAIN VALVE

CROSS REFERENCE TO RELATED APPLICATION

The present application is a continuation-in-part of my copending Application Ser. No. 98,610, filed Nov. 29, 1979, now abandoned.

BACKGROUND OF THE INVENTION

The present invention relates to valves for controlling fluid flow and more particularly to a snap-acting drain valve for releasing fluid from a fluid system upon the dropping of the temperature of the fluid within the system to a predetermined level. The invention has particular application for preventing freeze damage to cooling systems or processing or distribution lines containing liquid subject to freezing and is especially directed to engine cooling systems for locomotives which are not protected by antifreeze additives.

Diesel engine powered locomotives are run almost continuously, and it is thus conventional to dispense with the addition of antifreeze additives to the water circulated in the engine cooling systems. The locomotive engines are subject to stoppage, however, should they run out of fuel or should they be subject to mechanical breakdown. Under these conditions, it is essential that some form of automatic drain valve be provided to drain the coolant from the engine and cooling system when the coolant reaches a predetermined temperature level. The failure to release the coolant upon occurrence of freezing conditions could result in serious and extensive damage to the engine and cooling system due to the expansion of water upon its conversion from the liquid to the solid state.

The general concept of an automatic drain valve for draining a water line system is not new, and proposals for such valves for protecting water systems have been known for many years. The prior devices have not, however, provided the features required to provide an effective drain valve for locomotive cooling system use. A first requirement of such a valve is that the temperature sensing element thereof senses the temperature of the coolant rather than the temperature of the ambient air. Provided the engine is running, the cooling liquid will always remain well above the freezing level whereas the ambient air temperature will quite frequently be below freezing and the opening of the valve under such conditions would require immediate stoppage of the engine to avoid overheating.

An additional requirement is that the valve open in a snap-acting fashion and remain open until manually reset. A modulating type of valve would be ineffective for locomotive use since it can be expected that warmer coolant will flow from the engine block after the draining process has begun. This would tend to close the valve despite the fact that freezing conditions are imminent. Furthermore, a modulating type valve would tend to freeze at the outlet port since it can be expected that if the coolant is approaching the freezing level, the ambient air is already below freezing. The icing at the valve seat which could be expected with a modulating type valve would prevent a rapid drainage of the system and in severe conditions, could prevent a complete drainage entirely by blocking the drain valve with ice.

Another requirement of a drain valve for locomotive use is that it be quickly and easily manually reset to permit the system to be refilled and the engine to be restarted. The valve should desirably also be capable of manual opening as necessary, for example, for cleaning the system.

Furthermore, the system must be sufficiently rugged and reliable as to be able to withstand the substantial vibrations and impacts encountered with railroad equipment, especially during coupling and uncoupling of cars. The valve must be able to withstand such conditions without accidental release of the latching mechanism which would cause the drainage of the system and necessitate engine shutdown. Should this occur, a train could be stranded until an additional coolant supply were made available.

Finally, the temperature sensing device to be utilized with a locomotive drain valve must be able to withstand extreme variations in temperature ranging from near or above the boiling point of water to substantially below freezing and in some instances well below 0° F. after a system has been drained.

SUMMARY OF THE INVENTION

The present invention comprises a valve body defining a closed chamber and including port means for introduction into the chamber of fluid from the system to be monitored. A drain port is provided in the bottom of the valve body having a valve seat against which a valve element is resiliently held in sealed engagement. The valve element is actuatable toward and away from the valve seat by a valve stem which is normally held in a closed valve position by means of a temperature sensitive latching mechanism. The latching mechanism includes a pivotally mounted latching lever, one end of which engages a stop shoulder on the stem. The latching lever is spring loaded to urge the end in engagement with the stop shoulder away from the stem and shoulder but is held in the latched position by a temperature sensitive actuator which is immersed in the fluid within the valve body. Upon the lowering of the temperature of the fluid in the valve body chamber to a predetermined level the actuator permits the latching lever to move under spring force clear of the stop shoulder. The valve stem is spring loaded toward an open valve position and will accordingly snap to the open position and remain open until manually reset. The stop shoulder is relieved along one side thereof to permit the manual opening of the valve and also to facilitate the resetting of the valve under elevated temperature conditions.

It is accordingly a first object of the present invention to provide a drain valve for automatically draining fluid systems upon the lowering of the fluid temperature to a predetermined level.

A further object of the invention is to provide a drain valve as described which is non-modulating and which upon opening will remain fully open despite an increase in the system fluid temperature to a level above the predetermined trigger temperature.

A further object of the invention is to provide a drain valve as described which must be manually reset after opening and which can be manually opened if necessary.

Still another object of the invention is to provide a drain valve as described which is characterized by a relatively simple and reliable valve actuating mechanism which can be economically manufactured and maintained.

A still further object of the invention is to provide a drain valve as described which can endure continuous and heavy duty service under conditions of severe vibrations without accidentally triggering the valve opening actuating mechanism.

Additional objects and advantages of the invention will be more readily apparent from the following description of a preferred embodiment thereof when considered together with the accompanying drawings.

BRIEF DESCRIPTION OF THE DRAWINGS

FIG. 3 is a sectional view taken along line 3—3 of FIG. 2;

FIG. 4 is a view as in the upper half of FIG. 2 but showing the valve latching mechanism in the released position;

FIG. 5 is a view similar to FIG. 4 showing the valve latching mechanism in the latched position and with the actuator in an elevated temperature position;

FIG. 6 is a view of a portion of the latching mechanism as shown in FIG. 2 but with the valve stem rotated into the reset or release position;

FIG. 7 is a partial sectional view taken along line 7—7 of FIG. 6;

FIG. 8 is a sectional view of a second embodiment of a snap-acting drain valve in accordance with the present invention showing the valve in the latched or closed position;

FIG. 9 is a view similar to FIG. 8 showing the valve in the unlatched or open position;

FIG. 10 is a top plan view of the valve of FIGS. 8 and 9;

FIG. 11 is a sectional view taken along line 11—11 of FIG. 8;

FIG. 12 is an isolated perspective view showing the inner valve support frame of the valve embodiment of FIGS. 8-11; and FIG. 13 is a perspective exploded view showing the valve latching lever and a portion of the valve stem including the stop collar.

DESCRIPTION OF THE PREFERRED EMBODIMENT

Figure 2:
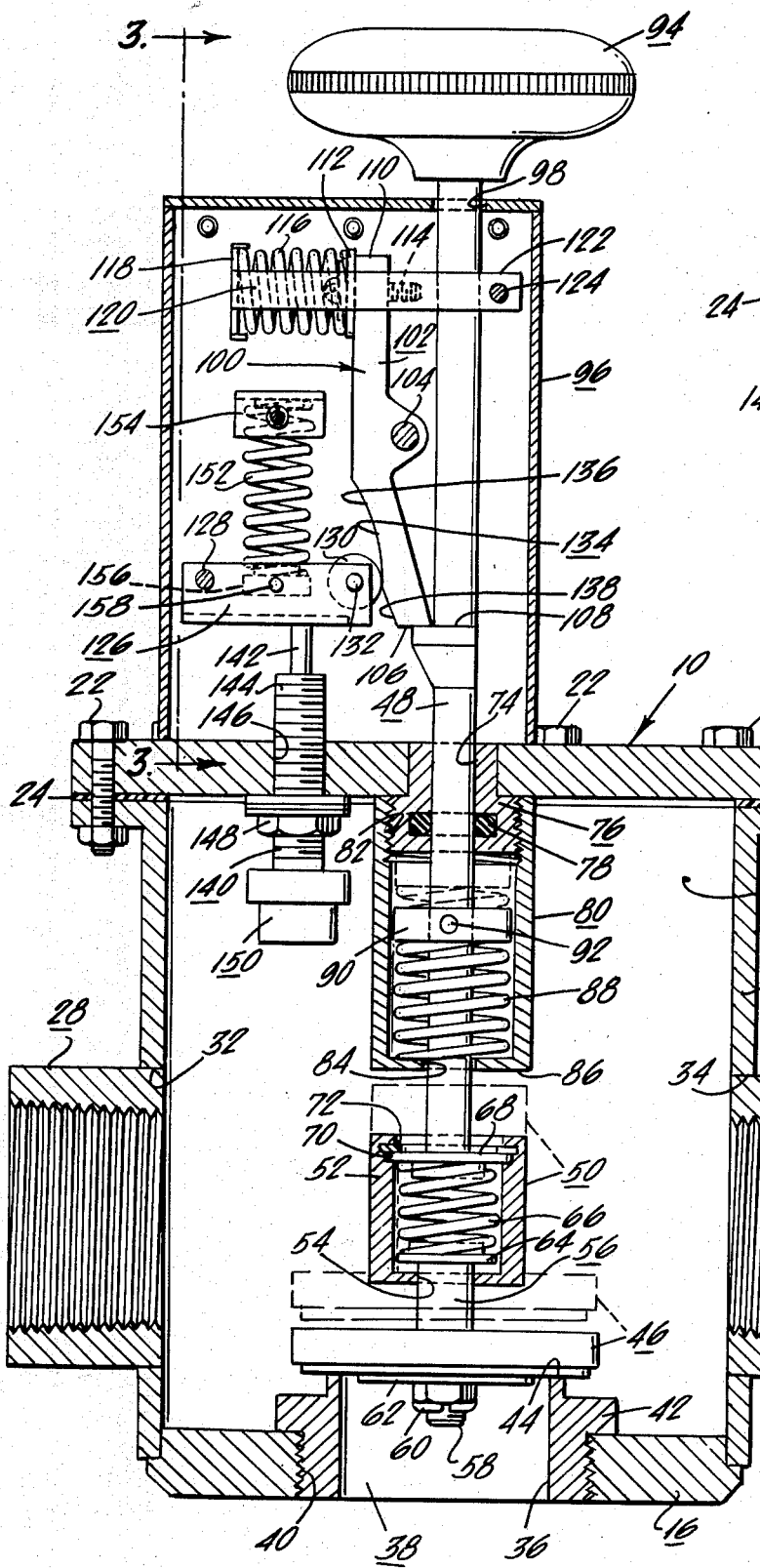
FIG. 2 is an enlarged sectional view taken along line 2—2 of FIG. 1.
Figure 1:
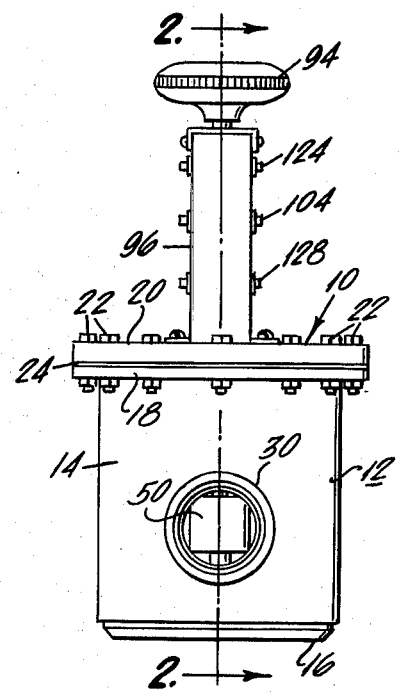
FIG. 1 is an end elevational view of a first embodiment of a snap-acting drain valve in accordance with the present invention.

Referring to the drawings and particularly FIGS. 1 and 2 thereof, a snap-acting drain valve generally designated 10 embodying the present invention comprises a valve body 12 having a generally cylindrical sidewall 14 and a bottom plate 16 secured thereto in fluid tight relation. The sidewall 14 includes at its upper edge an outwardly directed flange 18 to which a top plate 20 is demountably secured by bolts 22. A gasket 24 provides a fluid tight seal between the top plate and the sidewall flange 18. The top plate 20, sidewall 14 and bottom plate 16 form therewithin a valve chamber 26.

The drain valve 10 should be located in the fluid system to be drained at the lowest point in the system and should preferably be installed in such a manner that the system flow passes through the valve chamber 26. For this purpose, threaded inlet and outlet connectors 28 and 30 are respectively secured in apertures 32 and 34 in the valve body sidewall 14 in fluid tight sealed relation therewith. The connectors 28 and 30 accordingly provide inlet and outlet ports in the valve body and permit a flow of the system fluid into one side of the valve chamber 26 and out of the other side of the chamber. The direction of flow through the valve is unimportant and the connectors 28 and 30 have been arbitrarily designated as inlet and outlet fittings. The valve would also function effectively with only a single port for the system fluid although such a "dead end" installation would not as accurately sense the system fluid temperature as the illustrated flow through type valve.

A drain port 36 in the bottom of the chamber 26 is defined by a hollow valve seat member 38 which is externally threaded to cooperatively engage a threaded aperture 40 in the bottom plate 16. A shoulder 42 of the valve seat member 38 abuts the inner surface of the plate 16 and provides a fluid tight mounting of the seat assembly. The upper surface of the seat member 38 constitutes a valve seat 44 against which a valve element 46 is adapted to seat to close the drain port 36 in the normal operating condition of the system. The valve element 46 comprises a circular member having a diameter somewhat in excess of the valve seat 44 to permit seating of the valve element even in the case of misalignment of the members.

The valve element 46 is actuated by movement of valve stem 48 which is perpendicular to and concentric with the valve seat 44 and valve element 46. The connection of the valve element 46 to the valve stem 48 includes a lost motion means 50 which permits the valve stem 48 to be moved downwardly further than required to close the valve for reasons described below. The lost motion means 50 includes a hollow cylindrical connector 52 having an aperture 54 in the bottom thereof through which passes a connector shaft 56 having a reduced diameter threaded portion 58 which passes through the valve element 46 and is attached thereto by nut 60 and washer 62. The upper end of the connecting shaft 56 is formed to provide a spring seat 64 on which is seated the lower end of the compression spring 66. The upper end of spring 66 bears against a spring seat 68 secured to the lower end of valve stem 48. The spring seat 68 is of a larger diameter than the hollow bore of the connector 52 and is seated within a counterbore 70 thereof, being secured thereto by a retaining ring 72 seated within an annular slot in the connector. The connector 52 will accordingly move axially with movement of the valve stem 48 as will the connector shaft 56 and attached valve element 46 until the valve element is seated on the valve seat 44, at which time the spring 66 will compress to allow continued axial movement of the valve stem and connector 50.

The valve stem 48 is slidably supported within a bore 74 of bushing 76 mounted in the top plate 20 so as to provide a concentric relationship of the valve stem with the valve seat 44. A seal ring 78 disposed within an annular slot within the bushing 76 seals the slidable valve stem against fluid passage therealong. A hollow cylindrical spring support 80 is threadedly connected at its upper end to a threaded portion 82 of the bushing 76 and extends downwardly into chamber 26 concentrically around the valve stem 48. A bore 84 in the lower end 86 of the spring support 80 permits free passage of the valve stem. A compression spring 88 within the spring 80 is seated on the lower end 86 of the spring support and at its upper end bears against a spring seat 90 which is fixed to the valve stem 48 by pin 92. The spring 88 will accordingly serve to bias the valve stem in an upward direction, thereby urging the valve stem and the connected seat element 46 into the open position shown in broken lines in FIG. 2.

The valve stem 48 extends substantially above the top plate 20 of the valve body and includes at its upper end a knob 94 for manual actuation of the stem. The upper portion of the valve stem passes through a latching mechanism housing 96 disposed above the top plate 20 of the valve body 12, extending through a bore 98 therein. A temperature sensitive latching mechanism generally designated 100 disposed within the housing 96 comprises a latching lever 102 pivotally mounted near its center on a transverse pivot shaft 104 extending through and supported by the walls of the housing 96. The lower end 106 of the latching lever 102 is beveled to seat on a shoulder 108 of the valve stem 48. The shoulder 108 as shown in FIG. 7 extends about three quarters of the way around the valve stem 48, being omitted on one side of the stem to permit resetting of the valve under elevated temperature conditions or a manual opening of the valve as described below.

The upper end 110 of the latching lever 102 is provided with a spring seat 112 secured thereto by screw 114, the extending end of which serves to limit rotation of the latching lever in a clockwise direction by engagement with the valve stem as shown in FIG. 4. A compression spring 116 seated at one end of the valve seat 112 is seated at its other end against the end 118 of a spring support bracket 120, the parallel side arms 122 of which are pivoted on shaft 124 supported by the sides of the housing 96. The arms 122 are spaced outboard of the spring 116, latching lever 102, and the valve stem 48. The spring 116 accordingly serves to urge the latching lever 102 in a clockwise rotation about the shaft 104 and thus urges the lower end 106 thereof away from the valve stem 48 and its shoulder 108.

A trigger lever 126 is pivotally mounted on shaft 128 supported by housing 96 and as shown in FIG. 3 is shaped in the form of an upwardly opening channel member. A roller 130 is pivotally mounted adjacent the free end of the trigger lever 126 on a shaft 132 extending between the sides of the channel shaped lever. The peripheral surface of the roller 130 extends outboard of the trigger lever 126 and continuously engages a camming surface 134 of the latching lever 102 due to the rotational force imparted to the latching lever by spring 116. The camming surface 134 includes an upper arcuate portion 136 and a lower straight portion 138. The center of the curvature of the arcuate portion 136 is the center of the shaft 128 when the latching lever 102 is in the latched position shown in FIG. 2, and accordingly the upward (counterclockwise) movement of the trigger lever 126 from its horizontal position as shown in FIG. 5 will produce no corresponding movement of the latching lever 102. Downward movement of the trigger lever 126 will, however, permit the latching lever 102 to rotate in a clockwise manner as the roller 130 moves downwardly along the straight portion 138 of the camming surface 134 until ultimately the lower edge 106 of latching lever 102 clears the edge of shoulder 108 of the valve stem 48, thereby permitting the valve stem to rise under influence of spring 88 as shown in FIG. 4.

The movement of the trigger lever 126 is controlled by a temperature sensitive actuator 140 which is preferably of a conventional, commercially available wax pellet type and which produces mechanical movement of a piston 142 thereof in response to changes in temperature. The actuator 140 includes a threaded shank portion 144 which is engaged in a threaded bore 146 in the top plate 20 of valve body 12. A locknut 148 on the shank portion 146 secures the actuator in the desired axial position within the bore 144. This adjustment is critical inasmuch as it determines the vertical position of the actuator piston 142 for a given temperature of the fluid within the chamber 26. A temperature sensing element 150 of the actuator 140 extends into the chamber 26 and will accordingly sense the fluid temperature within the chamber.

The piston 142 bears against the lower surface of the trigger lever 126 and is maintained in continuous contact therewith by a compression spring 152 extending between a spring seat bracket 154 extending between the sidewalls of the housing 96 and a spring seat member 156 extending between the sidewalls of the channel shaped trigger lever 126 and pivoted about pivot 158. The trigger lever 126 will accordingly rotate about its axis 128 in accordance with temperature changes within the fluid chamber 26 as sensed by the actuator 140, moving upwardly with increasing fluid temperatures and downwardly with decreasing temperatures.

For operation, the valve is installed in the fluid system to be protected by joining the connectors 28 and 30 to the system at the lowest point thereof. The valve is closed by depressing handle 94, thereby seating the valve element 46 on valve seat 44 in fluid tight engagement. If the temperature within the chamber 26 is above the predetermined trigger temperature, the closing of the valve will require rotation of the knob 94 until the side of the valve stem having no shoulder is presented to the latching lever 102 as shown in FIGS. 6 and 7. The knob 94 is depressed as shown in FIG. 6 so that the shoulder 108 is disposed below the lower end 106 of the latching lever 102 as permitted by the lost motion means 50. The knob 94 is then rotated to move the shoulder 108 beneath the latching lever end 106, and, upon release of the knob 94, the spring 88 will move the valve stem and shoulder 108 into engagement with the latching lever. The drain valve is then armed and ready to open upon the occurrence of the predetermined lower temperature of the fluid within the chamber 26.

During the normal operation of the fluid system, the temperature of the fluid is at a temperature elevated above the predetermined valve opening temperature and the piston 142 of actuator 140 will accordingly be extended in the manner shown in FIG. 5 to thereby raise the trigger lever such that the roller 130 thereof is engaged with the arcuate portion 136 of the latching lever 102. Since the center of the arcuate surface 136 is the same as the center pivot of the trigger lever, there will be no resultant movement of the latching lever from movement of the trigger lever along the arcuate surface.

Upon occurrence of the predetermined temperature, the actuator piston lowers the trigger lever to the position as shown in FIG. 4 which permits the lower end 106 of the latching lever to move off the edge of the valve stem shoulder 108 under the influence of the spring 116. The valve stem will then move upwardly under the influence of spring 88 and thereby open the valve by lifting the valve element 46 off the valve seat 44. Fluid will then drain from the system through the open drain port and will continue to drain even if the fluid in the chamber 26 should exceed the predetermined trigger temperature as for example when water should flow from a hot engine block. The actuator will under such circumstances move the trigger lever upwardly and move the lower end of the latching lever to the right where it will move underneath the shoulder 108 which has been tapered to accommodate such latching lever movement.

Although in the illustrated embodiment the latching mechanism is shown located outside the chamber 26 within housing 96, it will be evident that the latching mechanism could be located within the chamber 26 if desired. Under conditions in which the fluid in the system is corrosive or contains particulate materials, the external location of the latching mechanism is preferred to prevent the deterioration or fouling of the mechanism parts.

It will also be apparent that, as indicated above, the system fluid need not flow through the valve chamber and accordingly one of the connectors 28 and 30 could either be removed or plugged.

Although other types of actuators such as bellows type actuators could be employed, the wax pellet type of actuator is preferred in view of its reliability and its resistance to elevated temperatures. By adjustment of the threaded shank portion 146 and locknut 148, the opening temperature of the valve can be very accurately adjusted. The wax type actuator develops a substantial actuating force, permitting the use of a rather strong spring to hold the trigger lever in position against the actuator piston. Under operating conditions involving heavy vibrations, such as would be encountered in locomotive use, the use of strong springs in the latching mechanism prevents unwanted oscillatory movement of the trigger and latching lever which could result in wear of the parts and a resultant loss of calibration.

A second embodiment of the invention is shown in FIGS. 8–13. This embodiment is similar to the embodiment described above, the primary difference being that the trigger lever has been omitted and the latching lever is controlled directly by the temperature-sensitive actuator.

Considering the details of the second embodiment, the valve generally designated 150 comprises a valve body 152 defining in conjunction with a top plate 154, a valve chamber 156. The top plate is secured in sealing engagement to the housing by means of a gasket 158 and bolts 160. A threaded inlet port 162 and a similarly threaded outlet port 164 in the housing 152 permit the connection of inlet and outlet conduits 162' and 164' as shown in broken lines. A drain port 166 in the bottom of the housing terminates at its inner end adjacent an inwardly facing annular valve seat 166.

An inner support frame 170 is disposed within the valve chamber 156. The support frame includes opposed parallel side walls 172, 172 having flanges 174, 174 at their upper edges by means of which the support frame is attached to the underside of the top plate 154 by means of screws 176. A cross member 178 connecting the lower edges of the side walls 172, 172 includes a central bore 180 therein.

A valve stem 182 extends through a bore 184 in the top plate 154, being sealed with respect thereto by a resilient gasket 186, and passes through the bore 180 in the cross member 178 of the support frame 170. At its lower end, the valve stem 182 is connected with a lost motion means 188 which is essentially of the same construction as the lost motion means 50 of the earlier described embodiment. A valve element 190 is connected with the lost motion means and is adapted to seat upon the valve seat 168 to close the drain port 162 in the closed or latched position of the valve stem 182. A guide means 192 is provided beneath the valve element 190 and slidable within the drain port 166 to prevent misalignment of the valve element.

A stop collar 194 is attached to the valve stem 182 at a point within the support frame 170 and includes an arcuate shoulder 196 extending radially therefrom. The shoulder 196 extends about three quarters of the way around the valve stem, a flat face 198 on one side thereof being flush with the body of the stop collar to permit the manual opening of the valve under elevated temperature conditions. A knob 200 is secured to the outer end of the valve stem 182 and is used for resetting the valve after its manual or automatic opening and also for manually opening the valve. As shown in FIG. 10, suitable indicia may be provided on the knob and the top plate to assist the user in correctly positioning the valve stem in the rotational sense.

A compression coil spring 202 is disposed around the valve stem between the cross member 178 and the stop collar shoulder 196 thereby urging the valve stem and accordingly the valve element 190 towards a raised or opened position. The valve is normally maintained in the closed position by a temperature-sensitive latching mechanism which includes a latching lever 204 which is pivotally mounted to a transverse pivot bar 206 extending between the side walls 172, 172 of the support frame 170. As shown most clearly in FIG. 13, a pair of side plates 208, 208 are attached to the latching lever 204, extending generally perpendicularly thereto and being joined at their outer end by a transverse rod 210. A tension coil spring 212 extends between the bar 210 and a second bar 214 disposed in slot 216 of the side members 172 of the support frame. The spring 212 accordingly will serve to continuously urge the latching lever 204 in rotation in a counterclockwise sense as viewed in FIGS. 8 and 9. As can be seen in FIG. 8, in the closed position of the valve, the latching lever 204 is disposed so that the lower end thereof engages the shoulder 196 of the stop collar 194 and prevents the valve from opening under the force of the spring 202. The latching lever 204 may include a tooth-like extension 216 having an acutely angled corner edge engaging the shoulder 196.

A temperature-sensitive actuator 218 which, as in the previous embodiment is preferably of a conventional, commercially available wax pellet type, produces mechanical movement of a piston 220 thereof in response to changes in temperature of the fluid within the valve chamber 156. The piston 220 bears directly against the latching lever 204 and opposes the rotational movement thereof due to the influence of the spring 212. The threaded shank portion of the actuator 218 is threadedly engaged with a flanged collar 222 which in turn is seated within a bore in a cross-member 224 secured in between the side walls of the port frame 170 by screw attachment to the ears 226, 226. The actuator and flanged collar 222 are normally seated with the flange of the collar engaging the cross member 224, being urged thereagainst by the force of a compression coil spring 228. The spring 228 engages the outer end of the actuator 218 and is seated at its other end within a hollow spring housing 230 screwed into a threaded bore in the wall of the valve body 152. The spring 228 has a substantially greater spring force than the spring 212 so that the spring 212, despite its longer lever arm, will not serve to compress the spring 228.

The operation of the second embodiment is virtually the same as that described above with respect to the first embodiment. To close the valve, the knob 200 is depressed with the flat 198 facing away from the tooth portion 216 of the latching lever 204. The spring mounting of the actuator 218 permits the valve to be closed even in an elevated temperature situation since the collar 222 may slide within the cross member 224 allowing the actuator to move to the right as viewed in FIGS. 8 and 9, compressing the spring 228. When the latching lever has engaged the shoulder 196 of the stop collar 194, the knob 200 may be released and the valve is set for automatic operation.

When the fluid temperature within the chamber 156 reaches a predetermined point, the piston 220 moves into the actuator, thereby permitting the latching lever 204 to move away from the shoulder 196 under the influence of the spring 212. As shown in FIG. 9, the valve then opens, the spring 202 acting to lift the valve stem and the valve element upwardly permitting flow through the drain port 166 as illustrated by the arrows.

For the manual release of the valve, the knob 200 is rotated 180° so that the flat portion 198 of the collar 196 is aligned with the latching lever permitting the valve stem to slide freely upwardly.

In FIG. 8 the actuator 218 is shown at a temperature at which the latching lever is moved fully inwardly against the stop collar 194. Should the fluid temperature within the chamber 156 increase, the latching lever cannot move further and therefore the actuator body will move with the collar 222 to the right to compress the spring 228. Upon lowering of the temperature, the actuator and collar will move back until the flange of the collar is seated against the cross member 224.

Manifestly, changes in details of construction can be effected by those skilled in the art without departing from the spirit and scope of the invention.

I claim:

1. A snap opening drain valve for draining fluid from a fluid system upon the occurrence of a predetermined temperature condition of the fluid, comprising a valve body defining a fluid chamber, fluid port means in said valve body for admitting fluid from said fluid system into said chamber, a drain port in said valve body, a valve seat on said valve body associated with said drain port, a valve element adapted for cooperative engagement with said valve seat for controlling flow through said drain port, a valve stem connected with said valve element for movement of said element toward and away from said valve seat to close or open said drain port, lost motion means connecting said valve stem with said valve element to permit said valve stem to be depressed beyond the closed valve position to facilite the resetting of the latching mechanism, spring means connected with said valve stem for urging said stem and valve element toward an open position, a pivotally mounted latching lever, stop means on said valve stem engageable by said latching lever to hold said valve stem and valve element in the closed position against said valve seat, spring means for biasing said latching lever out of engagement with said valve stem stop means, a temperature sensitive actuator disposed on said valve body responsive to the temperature of the fluid within said valve body, said actuator controlling the movement of said latching lever and holding said latching lever in engagement with said valve stem stop means until the temperature of the fluid in said valve body drops to a predetermined level.

2. The invention as claimed in claim 1 wherein said valve body fluid port means comprises fluid inlet and outlet ports permitting a continuous flow of fluid through said fluid chamber.

3. The invention as claimed in claim 1 wherein said actuator comprises a wax pellet type actuator.

4. The invention as claimed in claim 1 wherein said lost motion means includes spring means for resiliently biasing said valve element toward a closed valve position.

5. The invention as claimed in claim 1 including means permitting the manual opening of said valve when the temperature in the fluid chamber is above the predetermined level.

6. The invention as claimed in claim 1 including spring mounting means for said temperature-sensitive actuator, said mounting means permitting expansion of said actuator without movement of said latching lever when the temperature of the fluid in the valve chamber rises above a certain temperature.

7. The invention as claimed in claim 6 wherein said actuator spring mounting means presents a greater spring force to said actuator than said spring means for biasing said latching lever acting through said latching lever.

8. The invention as claimed in claim 1 wherein said latching lever is disposed in substantially parallel relation to said valve stem, and wherein said temperature-sensitive actuator is disposed in substantially perpendicular relation to said latching lever and in engagement therewith.

9. A snap opening drain valve for draining fluid from a fluid system upon the occurrence of a predetermined temperature condition of the fluid, comprising a valve body defining a fluid chamber, fluid port means in said valve body for admitting fluid from said fluid system into said chamber, a drain port in said valve body, a valve seat on said valve body associated with said drain port, a valve element adapted for cooperative engagement with said valve seat for controlling flow through said drain port, a valve stem connected with said valve element for movement of said element toward and away from said valve seat to close or open said drain port, spring means connected with said valve stem for urging said stem and valve element toward an open position, a pivotally mounted latching lever, a shoulder on said valve stem engageable by one end of said latching lever to hold said valve stem and valve element in the closed position against said valve seat, spring means for biasing said end of said latching lever away from said valve stem shoulder, a temperature sensitive actuator disposed on said valve body responsive to the temperature of the fluid within said valve body, and a pivotally mounted trigger lever controlled by said actuator, said trigger lever holding said latching lever in engagement with said valve stem shoulder until the temperature of the fluid in said valve body drops to a predetermined level.

10. The invention as claimed in claim 9 including a roller on said trigger lever in engagement with a camming surface on said latching lever, a portion of said camming surface having an arcuate configuration to permit movement of said trigger lever without affecting the position of said latching lever at temperatures above said predetermined temperature.

11. The invention as claimed in claim 9 wherein said actuator comprises a wax pellet type actuator.

12. The invention as claimed in claim 9 including spring means for holding said trigger lever in contact with said actuator.

13. The invention as claimed in claim 9 including lost motion means connecting said valve stem with said valve element to permit said valve stem to be depressed beyond the closed valve position to facilitate the resetting of the latching mechanism.

14. The invention as claimed in claim 13 wherein said lost motion means includes spring means for resiliently biasing said valve element toward a closed valve position.

15. The invention as claimed in claim 9 wherein said shoulder on said valve stem is interrupted at one side of said valve stem to permit upon rotation of said valve stem the movement of said valve stem past said latching lever under temperature conditions above said predetermined temperature for resetting or manual release of said valve.

16. A snap opening drain valve for draining fluid from a fluid system upon the occurrence of a predetermined temperature condition of the fluid, comprising a valve body defining a fluid chamber, fluid port means in said valve body for admitting fluid from said fluid system into said chamber, a drain port in said valve body, a valve seat on said valve body associated with said drain port, a valve element adapted for cooperative engagement with said valve seat for controlling flow through said drain port, a valve stem connected with said valve element for movement of said element toward and away from said valve seat to close or open said drain port, said valve stem being rotatably mounted and including means thereon permitting rotation thereof, spring means connected with said valve stem for urging said stem and valve element toward an open position, a pivotally mounted latching lever, stop means on said valve stem engageable by said latching lever to hold said valve stem and valve element in the closed position against said valve seat, spring means for biasing said latching lever out of engagement with said valve stem stop means, a temperature sensitive actuator disposed within said fluid chamber responsive to the temperature of the fluid within said valve body, said actuator controlling the movement of said latching lever and holding said latching lever in engagement with said valve stem stop means until the temperature of the fluid in said valve body drops to a predetermined level, said stop means including means permitting release of said valve stem from said latching lever and the opening of said valve upon rotation of said valve stem to a predetermined position.

17. The invention as claimed in claim 16 wherein said stop means comprises a shoulder on said valve stem, and wherein said means permitting release of said valve stem comprises a discontinuity of said shoulder.

18. The invention as claimed in claim 16 wherein said valve stem extends through said valve body and includes a handle on the extending portion thereof permitting manual rotation of said valve stem.

* * * * *